United States Patent
Omoya

(10) Patent No.: US 8,427,718 B2
(45) Date of Patent: Apr. 23, 2013

(54) IMAGE FORMING APPARATUS WITH DRIVING CARRIAGE TO A RETREAT POSITION

(75) Inventor: Shinichi Omoya, Osaka (JP)

(73) Assignee: Kyocera Mita Corporation (JP)

( * ) Notice: Subject to any disclaimer, the term of this patent is extended or adjusted under 35 U.S.C. 154(b) by 208 days.

(21) Appl. No.: 13/085,736

(22) Filed: Apr. 13, 2011

(65) Prior Publication Data

US 2011/0255130 A1 Oct. 20, 2011

(30) Foreign Application Priority Data

Apr. 15, 2010 (JP) ................................ 2010-093957

(51) Int. Cl.
*H04N 1/04* (2006.01)
(52) U.S. Cl.
USPC ............ 358/475; 358/474; 358/437; 358/1.2; 358/509; 358/488; 347/29; 347/86
(58) Field of Classification Search ................. 358/474, 358/437, 1.2, 509, 475, 488; 347/29, 86
See application file for complete search history.

(56) References Cited

U.S. PATENT DOCUMENTS

| | | | | |
|---|---|---|---|---|
| 5,612,765 | A * | 3/1997 | Yoshikawa et al. | 355/72 |
| 7,715,066 | B2 * | 5/2010 | Michiie | 358/474 |
| 8,068,260 | B2 * | 11/2011 | Baba | 358/449 |
| 2008/0297571 | A1 * | 12/2008 | Umeda | 347/85 |
| 2010/0053706 | A1 * | 3/2010 | Jasinski et al. | 358/498 |
| 2010/0315658 | A1 * | 12/2010 | Niikawa | 358/1.5 |

FOREIGN PATENT DOCUMENTS

| | | |
|---|---|---|
| JP | 05014638 | 1/1993 |
| JP | 2000307824 | 11/2000 |
| JP | 2008-52042 | 3/2008 |

\* cited by examiner

*Primary Examiner* — Benny Q Tieu
*Assistant Examiner* — Quyen V Ngo
(74) *Attorney, Agent, or Firm* — Gerald E. Hespos; Michael J. Porco; Matthew T. Hespos

(57) ABSTRACT

An image forming apparatus, includes an image reader with an original document table. An image reading part has a light source, a light-receiving part, a reflection part, and a carriage that supports the light source or the reflection part. A cover covers a replacement member and is opened/closed integrally with the image reader. A main body accommodates an operation part for performing operations based on image data. An axis connects the image reader to the main body and turnably supports the image reader and the cover in approaching/separating directions with respect to the main body. An open/close detector detects an open/closed state of the image reader and the cover and a movement controller moves the carriage in a sub-scanning direction. When the image reader and the cover are open, the movement controller moves the carriage to a retreat position that is outside the original document table.

3 Claims, 7 Drawing Sheets

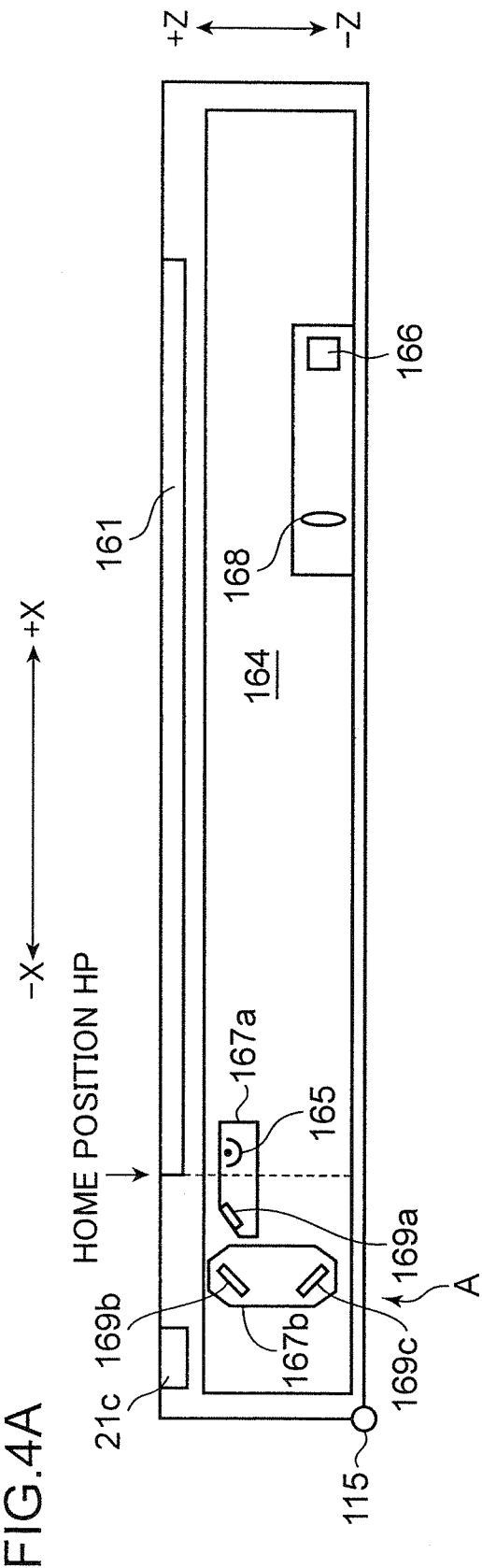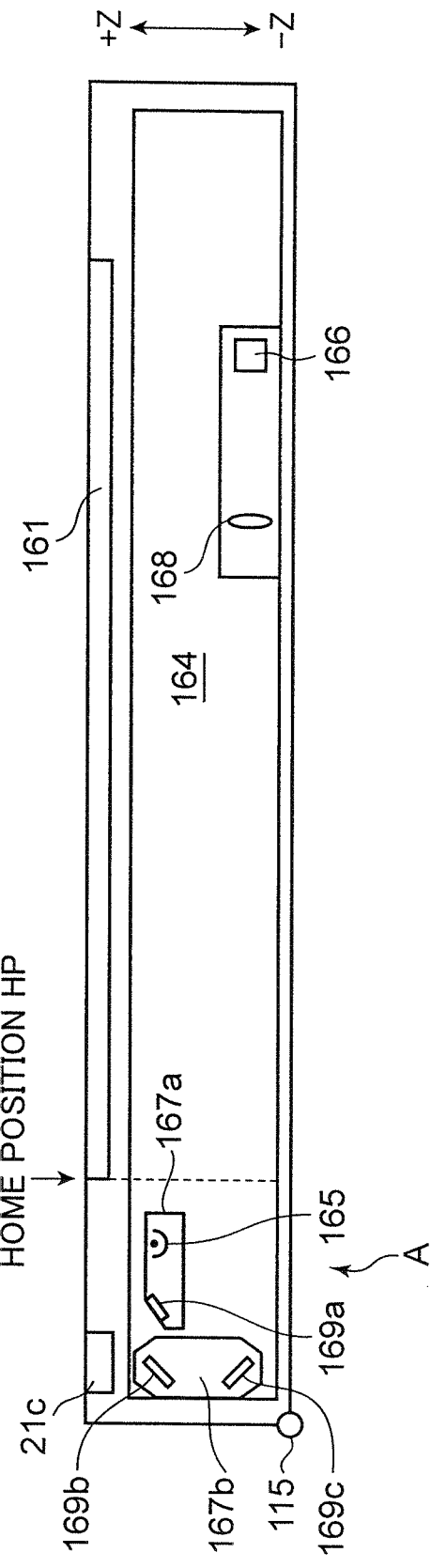

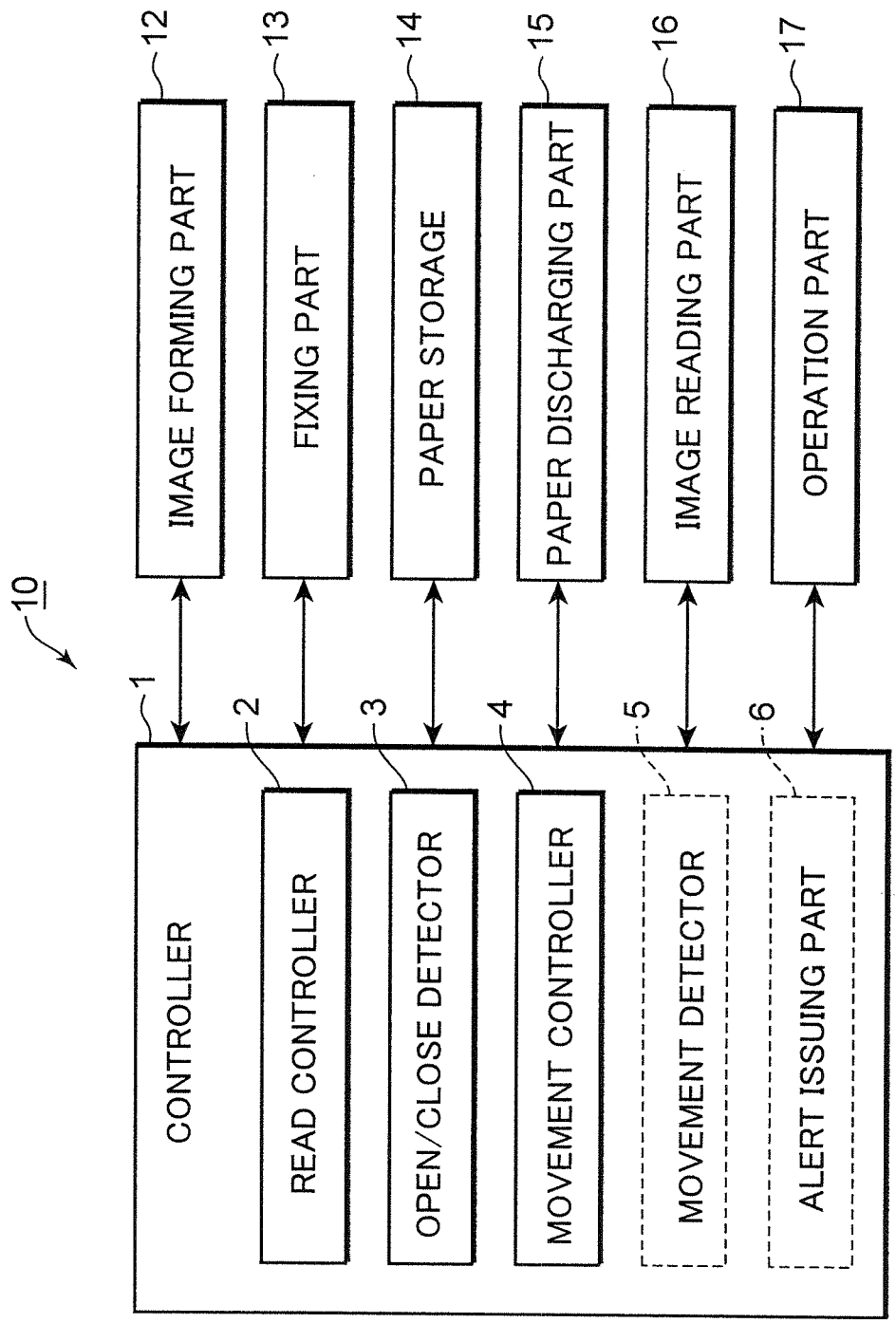

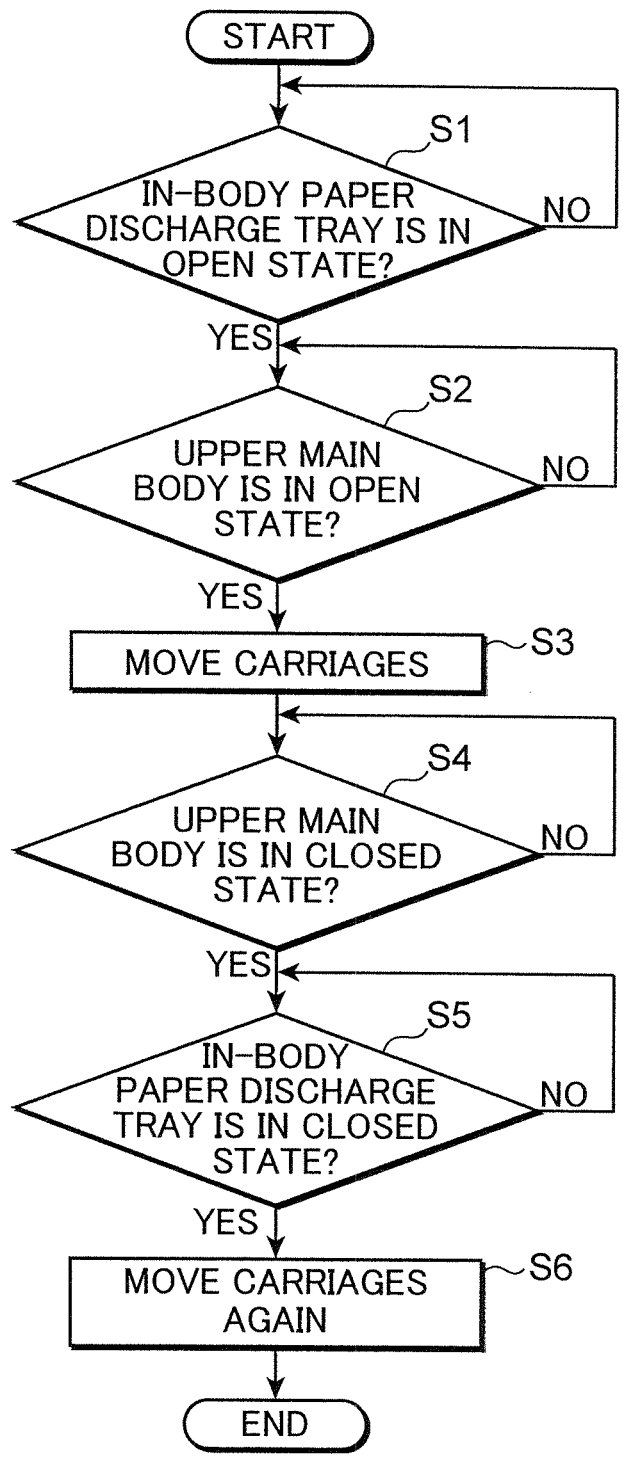

IMAGE FORMING APPARATUS WITH DRIVING CARRIAGE TO A RETREAT POSITION

BACKGROUND OF THE INVENTION

1. Field of the Invention

The present invention relates to technology for reducing damage to an image reader of an image forming apparatus in which the image reader and a cover for covering a replacement member are opened/closed in conjunction with each other.

2. Description of the Related Art

There has conventionally been known an image forming apparatus that processes image data of an original image that are generated by reading the original image on a surface of an original document by using an image reader such as a scanner. Examples of such image forming apparatus include not only the scanner itself but also a copy machine, a facsimile machine, and a combined machine with these functions, which are used for processing image data of an original image read by a scanner.

The image reader is configured by a light source having a white fluorescent lamp such as a cold cathode fluorescent tube, contact glass for placing the original image thereon, a group of mirrors for reflecting a line of reflected light running in a main scanning direction, an imaging lens, a CCD, and the like. The light source and the group of mirrors are installed on a carriage capable of moving in a sub-scanning direction perpendicular to the main scanning direction.

After the image reader receives an instruction to read the original image placed on the contact glass, the light source irradiates the original image placed on the contact glass. As a result, a line of reflected light running in the main scanning direction of the original image is reflected off the mirrors and enters the imaging lens. The light that enters the imaging lens is focused on a light-receiving surface of the CCD in order to form an image. After completion of reading this line on the original image in this manner, the carriage is moved in the sub-scanning direction to read the next line.

There is also known an image reader in which an ADF (automatic document feeder) is provided to an original document cover that covers platen glass (contact glass) on a ceiling surface of an original document placement table in an openable/closable manner, so that original documents are automatically conveyed one by one to a predetermined reading position on the platen glass to read an original image on each of the original documents.

SUMMARY OF THE INVENTION

The present invention is an improved version of the conventional technologies described above.

Specifically, the present invention is an image forming apparatus, having: an image reader, which has an original document table for placing an original image thereon; and an image reading part that has a light source part for irradiating the original image with illumination light, a light-receiving part that receives reflected light reflected off the original image when the illumination light is emitted from the light source part, and accordingly generates image data of the original image, a reflection part that reflects the reflected light from the original image toward the light-receiving part, and a carriage that supports the light source part and the reflection part; a replacement cover that covers a replacement member provided in the image forming apparatus and is opened/closed integrally with the image reader; a main body part that accommodates an operation part for performing operations based on the image data generated by the image reader; an opening/closing axis that connects the image reader and the main body part to each other and turnably supports the image reader and the replacement cover in an approaching/separating direction with respect to the main body part; an open/close detector that detects an open state in which the image reader and the replacement cover are separated from the main body part, and a closed state in which the image reader and the replacement cover are in abutment with the main body part; and a movement controller that moves the carriage in a sub-scanning direction in relation to a main scanning direction of the image reader, wherein when the open/close detector detects that the image reader and the replacement cover are in the open state, the movement controller moves the carriage to a retreat position that is located away from a position where the carriage faces the original document table, and is provided within a certain range previously determined with respect to the opening/closing axis.

BRIEF DESCRIPTION OF THE DRAWINGS

FIG. 4A is a diagram showing a state in which carriages are located in a home position.

FIG. 4B is a diagram showing a state in which the carriages are located in a retreat position.

FIG. 5 is a block diagram showing an electrical configuration of the combined machine.

FIG. 6 is a flowchart showing a process for moving the carriage by using a movement controller when the in-body paper discharge tray and an upper main body are opened/closed in conjunction with each other.

DETAILED DESCRIPTION OF THE PREFERRED EMBODIMENTS

An image forming apparatus according to an embodiment of the present invention is described hereinbelow with reference to the drawings. In the following embodiments, the image forming apparatus of the present invention is in the form of a combined machine having a color copy function, scanner function, printer function and the like.

Figure 1:
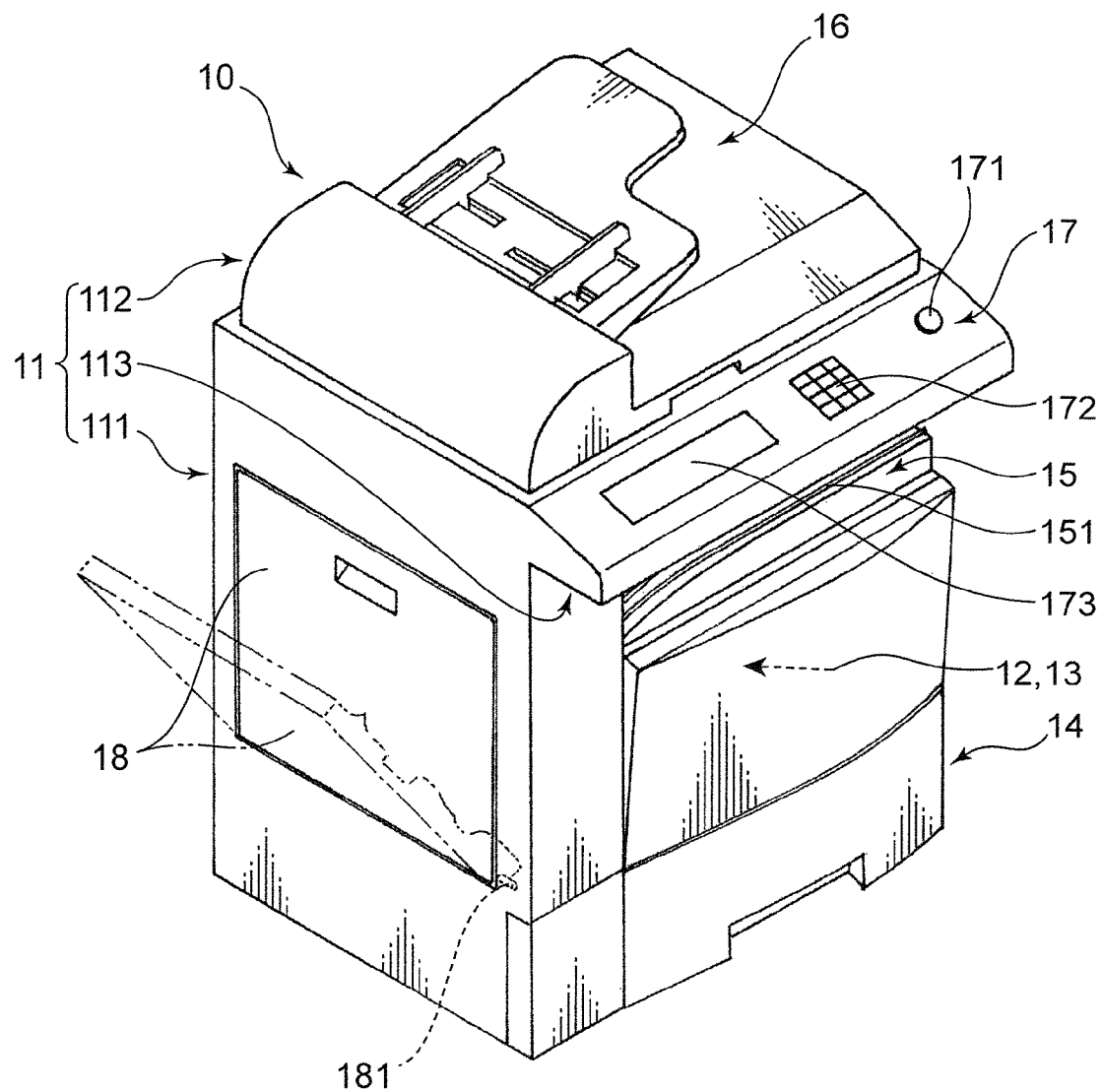
FIG. 1 is a perspective view showing a combined machine, an example of an image forming apparatus according to an embodiment of the present invention.
Figure 2:
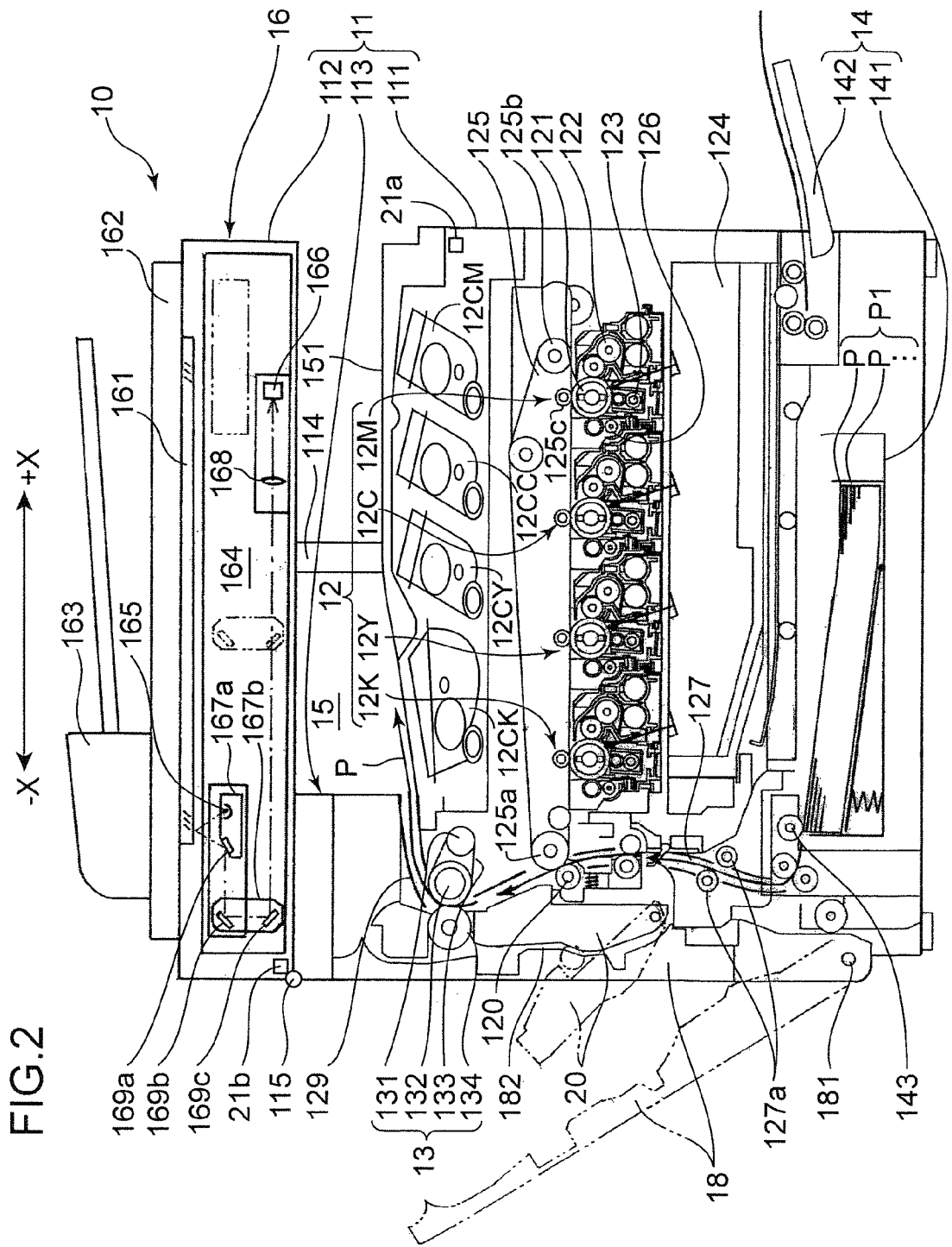
FIG. 2 is a cross-sectional diagram illustrating an internal structure of the combined machine.

FIG. 1 is a perspective view showing an embodiment of the combined machine according to the present invention. FIG. 2 is a cross-sectional diagram illustrating an internal structure of the combined machine. In FIGS. 1 and 2, an X-X direction is referred to as a lateral direction and sub-scanning direction, and a Y-Y direction as a longitudinal direction and main scanning direction. Specifically, a −X direction indicates the left, a +X direction the right, a −Y direction the front, and a +Y direction the rear.

A combined machine 10 shown in FIG. 1 is a so-called in-body paper discharge copy machine, wherein an image forming part 12, fixing part 13, paper storage 14, paper discharging part 15, image reading part 16, and operation part 17 are formed in an apparatus main body 11. The paper discharging part 15 is obtained by forming a part of the apparatus main body 11 under the image reading part 16 into a concave part.

The apparatus main body 11 has a lower main body 111 that is in the shape of a rectangular cuboid as viewed from the outside, an upper main body 112 that is in the shape of a flat rectangular cuboid and disposed above the lower main body 111 in a face-to-face manner, connecting elements 113, 114 interposed between the upper main body 112 and the lower main body 111, and an opening/closing axis 115 that connects the upper main body 112 and the connecting element 113 to each other and turnably supports the upper main body 112 in an approaching/separating direction with respect to the connecting element 113.

The connecting element 113 is a structural object for connecting the lower main body 111 and the upper main body 112 to each other, with the paper discharging part 15 formed therebetween. The connecting element 113 is provided upright on the left side of the lower main body 111.

Figure 3:
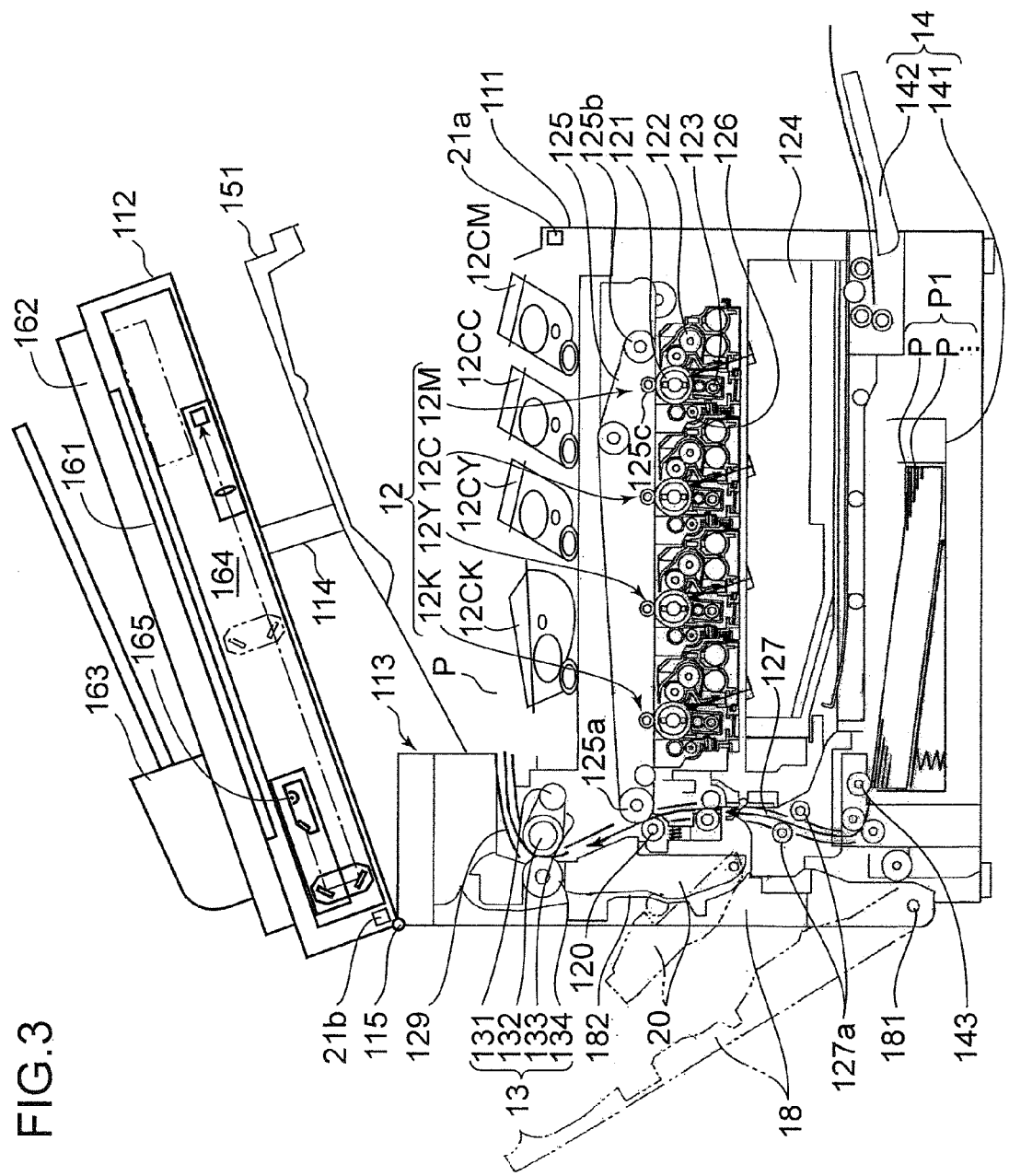
FIG. 3 is a diagram showing a state in which an image reader and an in-body paper discharge tray are integrally opened.

The upper main body 112 is configured to be able to turn around the opening/closing axis 115, which is a supporting point, in the approaching/separating direction with respect to the connecting element 113. The upper main body 112 is in a closed state as shown in FIG. 2 in which the left side of the upper main body 112 is in abutment with an upper end part of the connecting element 13, and enters an open state as shown in FIG. 3 in which the upper main body 112 separates from the connecting element 113 as the upper main body 112 turns around the opening/closing axis 115 and is opened obliquely upward with respect to the opening/closing axis 115.

The connecting element 114 is a structural object for connecting an in-body paper discharge tray 151 and the upper main body 112 to each other, the in-body paper discharge tray 151 being described hereinafter. The connecting element 114 is provided upright on a front edge and rear edge of the in-body paper discharge tray 151.

The lower main body 111 is mounted therein with the image forming part 12, the fixing part 13, and the paper storage 14. The upper main body 112 is installed with the image reading part 16.

In the present embodiment the operation part 17 protrudes forward from a front edge of the upper main body 112.

The paper discharging part 15 is formed between the lower main body 111 and the upper main body 112. The paper discharging part 15 has the in-body paper discharge tray 151 formed on an upper surface of the lower main body 111, wherein sheets P having toner images transferred thereto by the image forming part 12 are discharged from a lower part of the connecting element 113 toward the in-body paper discharge tray 151.

The in-body paper discharge tray 151 is configured as an openable/closable replacement cover for covering toner cartridges 12CM, 12CC, 12CY, 12CK that function as replacement members accommodated under the in-body paper discharge tray 151. Note that, because the in-body paper discharge tray 151 is connected to the upper main body 112 by the connecting element 114, the in-body paper discharge tray 151 is opened/closed integrally with the upper main body 112, as shown in FIG. 3.

The upper main body 112 is provided with a PI sensor 21b (photo interrupter) for detecting the open or closed state of the upper main body 112 and the in-body paper discharge tray 151. The PI sensor 21b measures the distance between the upper main body 112 and the connecting element 113 in accordance with the intensity of reflected light, to detect the open state in which the upper main body 112 is separated from the connecting element 113 or the closed state in which the upper main body 112 abuts against the connecting element 113. In a position below the in-body paper discharge tray 151 in the lower main body 111, there is provided a PI sensor 21a for measuring the distance between the in-body paper discharge tray 151 and the lower main body 111 in accordance with the intensity of the reflected light so as to detect the open/closed state of the in-body paper discharge tray 151.

As shown in FIG. 2, the image forming part 12 has a magenta unit 12M, cyan unit 12C, yellow unit 12Y, and black unit 12K for forming toner images on the sheets P fed from the paper storage 14. These units are disposed sequentially from an upstream (the right-hand side) toward a downstream.

The units 12M, 12C, 12Y, 12K have photosensitive drums 121 and developing devices 122. Each of the photosensitive drums 121 is supplied with toner from the corresponding developing device 122 while rotating counterclockwise in FIG. 2. Each of the developing devices 122 is replenished with the toner from the corresponding toner cartridge 12CM, 12CC, 12CY, 12CK disposed under the in-body paper discharge tray 151.

Chargers 123 are provided immediately below the photosensitive drums 121 respectively, and exposure devices 124 are provided in positions below the chargers 123. A circumferential surface of each photosensitive drum 121 is uniformly charged by the corresponding charger 123 and then irradiated with a laser beam by the corresponding exposure device 124, the laser beam corresponding to a color based on the image data read by the image reading part 16. As a result, an electrostatic latent image is formed on the circumferential surface of the photosensitive drum 121. The toner is supplied from the developing device 122 to this electrostatic latent image, forming a toner image on the circumferential surface of the photosensitive drum 121.

A position above the photosensitive drums 121 is provided with a transfer belt 125 (image carrier) that is stretched between a driving roller 125a and a driven roller 125b so as to abut against the photosensitive drums 121.

The transfer belt 125 is caused to face the circumferential surfaces of the photosensitive drums 121 by a drum transfer roller 125c of each of the photosensitive drums 121 and revolves around the driving roller 125a and the driven roller 125b in synchronization with each of the photosensitive drums 121.

Therefore, as the transfer belt 125 revolves, the photosensitive drum 121 of the magenta unit 12M transfers a magenta toner image to a surface of the transfer belt 125, and then the photosensitive drum 125 of the cyan unit 125C transfers a cyan toner image to the same position on the transfer belt 125. The photosensitive drum 121 of the yellow unit 12Y superimposes a yellow toner image onto the same position on the transfer belt 125, and finally the photosensitive drum 121 of the black unit 12K superimposes a black toner image.

As a result, a color image is formed on the surface of the transfer belt 125. The color image formed on the surface of the transfer belt 125 is transferred to each of the sheets P conveyed from the sheet storage 14.

A cleaning device 126 for getting rid of residual toner to clean the circumferential surface of each of the photosensitive drums 121 is provided in a left-side position of each of the photosensitive drums 121, as shown in FIG. 2. The circumferential surfaces of the photosensitive drums 121 that are cleaned by the cleaning device 126 are subjected to a new charging process by the respective chargers 123.

The waste toner that is removed from the circumferential surfaces of the photosensitive drums 121 by the respective cleaning devices 126 is recovered to a toner recovery bottle, not shown, through a predetermined passage.

A left-side position of the image forming part 12 is provided with a paper conveyance path 127 extending in a vertical direction. The paper conveyance path 127 has a pair of conveyance rollers 127a and conveys the sheets P, fed from the paper storage 14, to the transfer belt 125 wrapped around the driving roller 125a, by driving the pair of conveyance rollers 127a.

In the paper conveyance path 127, a secondary transfer roller (transfer roller) 120 is provided at a position facing the driving roller 125a such that a circumferential surface of the secondary roller 120 faces the surface of the transfer belt 125. Each of the sheets P conveyed through the paper conveyance path 127 is pressed and held between the transfer belt 125 and the secondary transfer roller 120, and accordingly the toner images on the transfer belt 125 are transferred to each of the sheets P.

The fixing part 13 performs a fixation process for fixing the toner images on each of the sheets P transferred in the image forming part 12. The fixing part 13 has a heat roller 131 with a heat source such as a halogen lamp or other electric heat generating element, a fixing roller 132 disposed on the left-hand side thereof so as to face the heat roller 131, a fixing belt 133 wrapped around the fixing roller 132 and the heat roller 131, and a pressure roller 134 disposed on the left-hand side of the fixing belt 133 so as to face the fixing belt 133.

After the sheets P with the transferred toner images thereon are guided from the image forming part 12 via the secondary transfer roller 120, the toner images are fixed on each sheet P in a heating process by the fixing belt 133, while the sheet P is pressed and held between the fixing roller 132 and the pressure roller 134 with the fixing belt 133 therebetween, whereby a stable color image is formed on the sheet P. Upon completion of the fixation process for color-printing the sheet P, the sheet P passes through a paper discharge conveyance path 129 that extends from an upper part of the fixing part 13, and is discharged toward the in-body paper discharge tray 151.

The sheet storage 14 has a paper tray 141 installed detachably in a position below the exposure devices 124 of the apparatus main body 11, and a manual tray 142 provided openably on a right side surface of the lower main body 11. A pile of sheets P1 is stored in the paper tray 141. Driving a pickup roller 143 delivers the sheets P, one by one, from the pile of sheets P1 stored in the paper tray 141 and introduces the sheets P into the image forming part 12 via the paper conveyance path 127.

The manual tray 142 is used for manually feeding the sheets P one by one. The sheets P that are fed from the manual tray 142 are sent to the image forming part 12 via a bypass conveyance path formed above the paper tray 141.

The image reading part 16 has contact glass 161, which is installed in an upper surface opening of the upper main body 112 and on which original documents are placed with their surfaces facing down, an original document cover 162 in the shape of a flat rectangular cuboid, which is opened/closed freely with respect to the contact glass 161 in order to press the original documents placed on the contact glass 161, an automatic original document reader 163 provided above the original document cover 162, and an optical system unit 164 that is installed inside the upper main body 112 and reads original images of the original documents placed on the contact glass 161 or sent from the automatic original document reader 163 onto the contact glass 161.

The optical system unit 164 has a light source 165 configured by a white fluorescent lamp such as a cold cathode fluorescent tube (an LED light source may be used), a first mirror 169a, a second mirror 169b, a third mirror 169c, a first carriage 167a, a second carriage 167b, an imaging lens 168, and a CCD (Charge Coupled Device) 166. The light source 165 and the first mirror 169a are supported by the first carriage 167a, and the second mirror 169b and the third mirror 169c are supported by the second carriage 167b.

In a case where no original image reading requests are received for a certain period of time, the light source 165 is turned off, and, as shown in FIG. 4A, the first carriage 167a is disposed in a home position HP located at an end part of the contact glass 161 near the opening/closing axis 115 side.

An original document reading method by the optical system unit 164 has a flat bed reading mode in which the original documents placed on the contact glass 161 are read, and an ADF reading mode in which the original documents are loaded by the automatic original document reader 163 to read the original documents during the conveyance thereof.

In the flat bed reading mode, the light source 165 irradiates the original documents placed on the contact glass 161, and a line of reflected light running in the main scanning direction is reflected off the first mirror 169a, the second mirror 169b, and the third mirror 169c sequentially in this order and enters the imaging lens 168. The light that enters the imaging lens 168 is focused on a light-receiving surface of the CCD 166 in order to form an image.

The CCD 166, a one-dimensional image sensor, processes a line of image in the main scanning direction of the original images at the same time. After completion of reading this line, the first carriage 167a and the second carriage 167b are moved in a direction perpendicular to the main scanning direction (i.e., the sub-scanning direction, the direction shown by the arrow X) by a drive power of a driving motor, not shown, to prepare for reading of the next line. Upon completion of the reading of the original image, the light source 165 is turned off, and the first carriage 167a is returned to the home position HP.

In the ADF reading mode, the first carriage 167a and the second carriage 167b are moved, by a predetermined distance, in the sub-scanning direction to a predetermined reading position near the contact glass 161. The automatic original document reader 163 loads the original documents, one by one, onto the contact glass 161. When each original document passes through the predetermined reading position on the right-hand side of FIG. 4A from the home position HP, the light source 165 irradiates the original document, and a line of reflected light running in the main scanning direction is reflected off the first mirror 169a, the second mirror 169b, and the third mirror 169c sequentially in this order and enters the imaging lens 168. The light that enters the imaging lens 168 is focused on the light-receiving surface of the CCD 166 in order to form an image.

Thereafter, each of the original documents is conveyed by the automatic original document reader 163 so as to be subjected to the subsequent line reading. Upon completion of the reading of the original image, the light source 165 is turned off, and the first carriage 167a is disposed in the home position HP again.

Next is described on the assumption reading the original image in the flat bed reading mode.

Specifically, the contact glass 161 is an example of the original document table according to the present invention, and the light source 165 is an example of the light source part according to the present invention. The first mirror 169a, the second mirror 169b, and the third mirror 169c are each an example of the reflection part according to the present invention. The imaging lens 168 and the CCD 166 are each an example of the light-receiving part according to the present invention. The first carriage 167a and the second carriage 167b are each an example of the carriage according to the present invention.

The original image read by the optical system unit 164 is subjected to a digitalization process and then output to the exposure devices 124 of the image forming part 12.

The operation part 17 performs input operations for inputting various items (a sheet size, the number of pages to be processed, etc.) associated with an image formation process. As shown in FIG. 1, the operation part 17 is provided with a start key 171 for inputting an execution instruction to perform the operation for reading original images and other execution instructions to perform various functions provided in the image forming apparatus, a numerical keypad 172 for inputting numerical information, and an LCD (Liquid Crystal Display) 173 for displaying the information that are actually input through the numerical keypad 172 or error messages.

An openable/closable maintenance door 18 is provided over substantially the entire left surface of the apparatus main body 11. The maintenance door 18 is opened in case of trouble such as a paper jam on the left surface side within the lower main body 111. The maintenance door 18 is turnably supported such that a lower end part thereof can turn around a door axis 181, and is turned counterclockwise around the door axis 181 from a closed state so as to be opened in FIG. 3.

An openable/closable cover unit (cover member) 20 for covering a left side surface of the image forming part 12 is provided immediately to the right-hand side of the maintenance door 18 on the side of the lower main body 111, and within the lower main body 111, as shown in FIG. 3. The paper conveyance path 127 is formed at an appropriate section between a right surface of the closed cover unit 20 and the side part of the image forming unit 12 (a left wall surface of the lower main body 111 in FIG. 3). A reverse conveyance path 182 is formed between a left surface of the closed cover unit 20 and the closed maintenance door 18.

The reverse conveyance path 182 is used when performing both-side printing on each sheet P. In other words, when performing both-side printing, the fixing part 13 performs the fixation process, and thus obtained one-side printed sheet P is reversely sent through the reverse conveyance path 182. Consequently, the sheet P is reversed and fed between the transfer belt 125 and the secondary transfer roller 120 of the image forming part 12 again, in order to perform a print process on the other side of the sheet P.

In a case of a paper jam in the reverse conveyance path 182, the maintenance door 18 is opened in order to resolve the paper jam. In a case of a paper jam in the paper conveyance path 127, the maintenance door 18 is opened along with the cover unit 20 in order to resolve the paper jam.

FIG. 5 is a block diagram showing an electrical configuration of the combined machine 10 shown in FIGS. 1 and 2. As shown in FIG. 5, the combined machine 10 has a controller 1 that controls the operations of the parts such as the image forming part 12, fixing part 13, paper storage 14, paper discharging part 15, image reading part 16, and operation part 17 that are described above.

The controller 1 is configured by a RAM (Random Access Memory) serving to temporarily store data or functioning as a work space, a flash memory for storing programs in advance, and a CPU that reads the programs from the flash memory and executes the programs. The CPU and the RAM are configured to accept data via a data bus. The CPU appropriately executes the programs stored in the flash memory so as to execute processes appropriate for the contents of the programs.

The controller 1 functions as a read controller 2, an open/close detector 3, and a movement controller 4.

The read controller 2 controls the reading operation performed by the carriages 167a, 167b of the image reading part 16. When an original image reading request is received via the operation part 17, the read controller 2 performs a control for reading images, one line by one line, while moving the carriages 167a, 167b in the sub-scanning direction under the control of the movement controller 4, which is described hereinafter.

The open/close detector 3, having the PI sensors 21a, 21b, detects, based on signals from the PI sensors 21a, 21b, the open/closed state of the in-body paper discharge tray 151 functioning as a replacement cover for covering the upper main body 112 and the replacement members, which are the toner cartridges 12CM, 12CC, 12CY, 12CK.

The movement controller 4 controls a stepping motor or a driving motor of a drive circuit or the like, to move the carriages 167a, 167b in the sub-scanning direction. Furthermore, when the open/close detector 3 detects that the upper main body 112 and the in-body paper discharge tray 151 are in the open state, the movement controller 4 moves the carriages 167a, 167b to the outside the contact glass 161. In other words, the movement controller 4 moves the carriages 167a, 167b to a retreat position which is outside the contact glass 161, that is, located away in the sub-scanning direction from a position facing the contact glass 161 and is provided within a certain range previously determined with respect to the opening/closing axis 115.

The retreat position provided within the certain range previously determined with respect to the opening/closing axis 115 represents a position where the first carriage 167a is located at the far left of the home position HP, the position being the farthest end part to which the movement controller 4 can move the first carriage 167a toward the far left in the sub-scanning direction (a position where the second carriage 167b comes into contact with a left wall of the optical system unit 164). Note that this position is merely an example of the retreat position and does not intend to limit the retreat position. The retreat position is a position where the carriages 167a, 167b do not come into contact with the contact glass 161 even when vibrated.

More specifically, the image reader of the present invention is configured by, for example, the upper main body 112 having the image reading part 16 and the operation part 17, the read controller 2, and the movement controller 4. The image reading part 12, the fixing part 13 and the paper storage 14 are accommodated in the lower main body 111 as the examples of the parts that perform operations based on the image data generated by the image reader of the present invention. In other words, the lower main body 111 is an example of the main body part according to the present invention.

Next is described a process flow in which the movement controller 4 moves the carriages 167a, 167b when the in-body paper discharge tray 151 and the upper main body 112 are integrally opened/closed.

As shown in FIG. 6, when the PI sensor 21a of the open/close detector 3 detects that the in-body paper discharge tray 151 is in the closed state (S1; YES) and the PI sensor 21b detects that the upper main body 112 is in the open state (S2; YES), the movement controller 4 moves the carriages 167a, 167b to the retreat position described earlier (S3).

Also, when the PI sensor 21b of the open/close detector 3 detects that the upper main body 112 is in the closed state (S4; YES) and the PI sensor 21a detects that the in-body paper discharge tray 151 is in the closed state (S5; YES), the movement controller 4 moves the carriages 167a, 167b again so that the first carriage 167a is brought to the home position HP (FIGS. 4A and 4B) (S6).

It should be noted that step S3 may be executed when it is detected in either step S1 or step S2 that the upper main body 112 or the in-body paper discharge tray 151 is in the open state.

Specifically, according to this configuration, when the open states of the upper main body 112 and the in-body paper discharge tray 151 are detected by the PI sensors 21a, 21b of the open/close detector 3 when the in-body paper discharge tray 151 and the upper main body 112 are integrally opened/closed in order to replace the toner cartridges 12CM, 12CC, 12CY, 12CK of the combined machine 10, the movement controller 4 moves the carriages 167a, 167b to the retreat position.

For instance, in a case of an image forming apparatus where image data read by its image reader are printed on a piece of printing paper by means of toners, it is necessary to provide a cover (a replacement cover) that is opened/closed in order to replace replacement members such as toner cartridges. However, when the replacement cover and the image reader are disposed adjacent to each other in order to conserve space in the apparatus, large vibrations are imposed on the image reader when replacing the replacement members, and carriages of the image reader might touch contact glass, damaging the carriages and the contact glass. In this regard, according to the present invention, the image reader is opened/closed integrally with the replacement cover that is provided in the image forming apparatus in order to replace the replacement members, so that the work space required for replacing the replacement members can be reduced.

Moreover, the present invention can reduce damage to the contact glass 161 and the carriages 167a, 167b that is caused when the carriages 167a, 167b hit the contact glass 161 due to the vibrations imposed on the upper main body 112 when integrally closing the in-body paper discharge tray 151 and the upper main body 112 after replacing the toner cartridges 12CM, 12CC, 12CY, 12CK.

In addition to the configuration described above, the controller 1 may have, as shown by the dashed lines in FIG. 5, a movement detector 5 that detects whether or not the carriages 167a, 167b are moved to the retreat position, and an alert issuing part 6 for issuing an alert when the movement detector 5 detects that the carriages 167a, 167b are not moved to the retreat position in a case in which the open/close detector 3 detects that the upper main body 112 and the in-body paper discharge tray 151 are about to be in the closed state.

The movement detector 5 can be configured by providing the PI sensor 21c at an upper part of the left wall of the optical system unit 164, as shown in FIGS. 4A and 4B, for example. The PI sensor 21c detects that a right end part of the first carriage 167a is moved to a position on the left of the home position HP and that the second carriage 167b is moved to a position A where it comes into contact with the left wall of the optical system unit 164. The PI sensor 21c can be provided above the position A.

When the distance between the upper main body 112 and the connecting element 113 detected by the PI sensor 21b is shorter than a predetermined distance, the open/close detector 3 detects that the upper main body 112 is about to be in the closed state, and sends an execution instruction to the alert issuing part 6 immediately before step S4 mentioned above (FIG. 6).

The alert issuing part 6 can be configured by, for example, a buzzer that can issue an alert tone or an LCD 173 that displays an alert message under the display control of the controller 1 when it is detected, immediately before step S4 shown in FIG. 6 (when the upper main body 112 is about to be in the closed state), that the first carriage 167a is not moved to the retreat position.

According to this configuration, when the open/close detector 3 detects that the upper main body 112 is about to be in the closed state, and when the movement detector 5 detects that the first carriage 167a is not moved to the retreat position, the alert issuing part 6 issues an alert.

Therefore, even when the carriages 167a, 167b are not moved to the retreat position due to, for example, a failure in the movement controller 4, a user can be alerted by the alert issuing part 6 and can carefully close the in-body paper discharge tray 151.

In other words, damage to the contact glass 161 and the carriages 167a, 167b can be reduced by reducing the vibrations imposed when closing the in-body paper discharge tray 151.

Moreover, in addition to the configuration described above, the image reading part 16 may further have a lock mechanism 22 that regulates the movement of the carriages 167a, 167b in the sub-scanning direction that is caused by the movement controller 4.

Figure 7A:
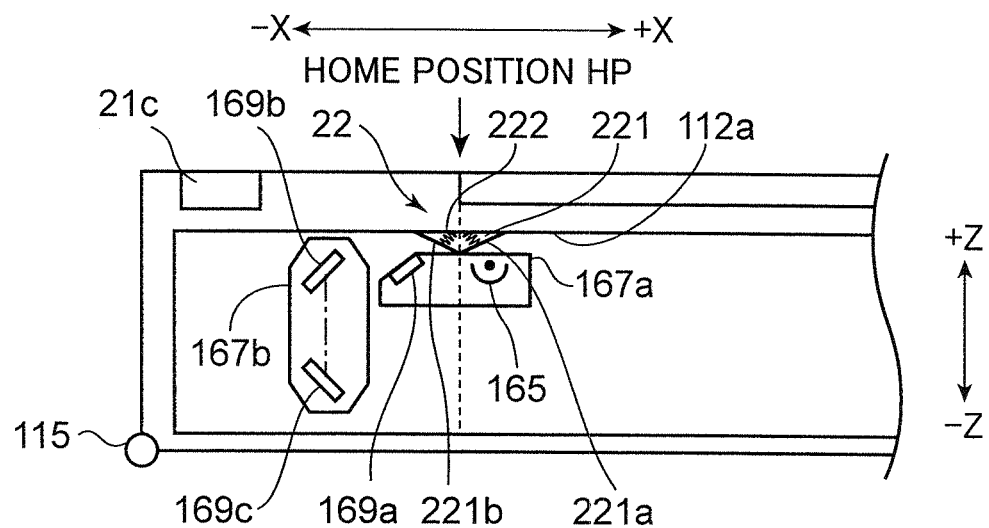
FIG. 7A is a diagram showing a first posture of a lock mechanism.
Figure 7B:
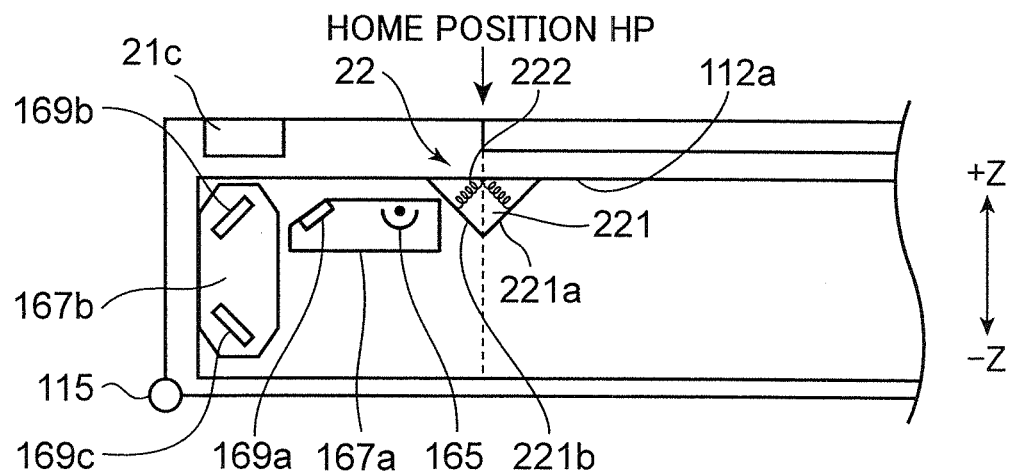
FIG. 7B is a diagram showing a second posture of the lock mechanism.

As shown in FIGS. 7A and 7B, the lock mechanism 22 has a lock member 221 provided at a position that is above the path of the movement of the carriages 167a, 167b, and is closer to the contact glass 161 than the retreat position in the sub-scanning direction, as well as a biasing member 222 that biases the lock member 221 toward the carriages 167a, 167b (−Z direction in the diagram) that move along the path of the movement thereof.

The lock member 221 has a first inclined part 221a and a second inclined part 221b, each of which is in the shape of a plate and extends in the main scanning direction. The first inclined part 221a and the second inclined part 221b are formed in the lock member 221 so as to face the carriages 167a, 167b. The first inclined part 221a and the second inclined part 221b are attached in a manner that upper end parts thereof can slide in the sub-scanning direction along an upper wall 112a (the −X direction and the +X direction shown in FIGS. 7A and 7B). Furthermore, lower end parts of the first inclined part 221a and the second inclined part 221b are bonded to each other so that the first inclined part 221a and the second inclined part 221b can change the postures thereof between the posture shown in FIG. 7A and the posture shown in FIG. 7B.

The first inclined part 221a is inclined such that the upper side thereof is close to the side opposite to the retreat position (the +X direction), whereas the lower side of the same faces to the retreat position (the −X direction), as shown in FIG. 7B. The second inclined part 221b is inclined such that the upper side thereof is close to the retreat position (the −X direction), whereas the lower side of the same faces the side opposite to the retreat direction (+X direction), as shown in FIG. 7B.

The biasing member 222 is configured by, for example, a presser spring. The biasing member 222 is provided in two places within an internal space of the lock member 221 surrounded by the first inclined part 221a and the second inclined part 221b, the lower end parts of which are bonded to each other as described above. For example, one of the biasing members 222 is provided such that the lower end part thereof is attached to an inner wall of the first inclined part 221a and an upper end part of the same to the upper wall 112a. The other biasing member 222 is provided such that the lower end part thereof is attached to an inner wall of the second inclined part 221b and an upper end part of the same to the upper wall 112a. Each biasing member 222 ("biasing member 222"

described hereinafter indicates a pair of two biasing members) biases the first inclined part 221a and the second inclined part 221b in the −Z direction to keep the lock mechanism 22 in a second posture shown in FIG. 7B, and contracts when a pressing force in the +Z direction is applied to the first inclined part 221a and the second inclined part 221b, so as to change the posture of the lock mechanism 22 to a first posture shown in FIG. 7A.

Specifically, the biasing member 222 supports the lock mechanism 22 so that the lock mechanism 22 can move freely between the first posture (FIG. 7A) that allows the carriages 167a, 167b to be moved in the sub-scanning direction toward the retreat position or the contact glass 161 by the drive power of the movement controller 4, and the second posture (FIG. 7B) that is lower than the position of the first posture so as to regulate the movement of the carriages 167a, 167b in the sub-scanning direction.

In addition, the lock mechanism 22 may be provided below the path of the movement of the carriages 167a, 167b by vertically inverting the configuration shown in FIGS. 7A and 7B.

Note that a biasing force P of the biasing member 222 that is applied in the −Z direction is set smaller than a pressing force P1 that is applied in the +Z direction by the movement of the carriages 167a, 167b caused by the drive power of the movement controller 4, and set larger than a pressing force P2 that is applied in the +Z direction by natural movement of the carriages 167a, 167b that is made independently of the movement controller 4.

The biasing force of the biasing member 222 changes the first posture (FIG. 7A) to the second posture (FIG. 7B) when the in-body paper discharge tray 151 and the upper main body 112 are integrally opened and the carriages 167a, 167b are moved in the sub-scanning direction from the home position HP to the retreat position by the drive power of the movement controller 4 to release the lock mechanism 22 from the pressure applied by the carriage 167a in the +Z direction.

After the movement controller 4 moves the carriages 167a, 167b to the retreat position, the lock mechanism 22 keeps its second posture (FIG. 7B) without moving in the +Z direction, even when the pressing force in the +Z direction is applied to the second inclined part 221b by the natural movement of the carriages 167a, 167b that is made independently of the movement controller 4. When the second inclined part 221b is applied with a pressing force by a front part of the carriages 167a, 167b in the direction of movement of the carriages 167a, 167b that move in the sub-scanning direction from the retreat position to the contact glass 161 by means of the drive power of the movement controller 4, the lock mechanism 22 moves in the +Z direction so as to be in the first posture (FIG. 7A).

When the carriages 167a, 167b are moved in the sub-scanning direction from the retreat position to the contact glass 161 by the drive power of the movement controller 4 (in the +X direction in the diagram), and when a front end part of the carriage 167a that is moved in this +X direction presses the second inclined part 221b of the lock member 221 in this +X direction, the pressure applied accordingly by the front end part of the carriage 167a is converted to a pressure in the +Z direction by the inclination of the second inclined part 221b. Consequently, the lock member 221 moves in the +Z direction, from the position of the second posture (FIG. 7B) to the position of the first posture (FIG. 7A).

The carriages 167a, 167b that are located in a position of the +X direction side than the home position HP are moved (in the −X direction in the diagram) toward the home position HP (or toward the retreat position) by the drive power of the movement controller 4, and when the front end part of the carriage 167a that is moved in this −X direction presses the first inclined part 221a of the lock member 221 in this −X direction, the pressure applied accordingly by the front end part of the carriage 167b is converted to a pressure in the +Z direction by the inclination of the first inclined part 221a. Consequently, the lock member 221 moves in the +Z direction from the position of the second posture (FIG. 7B) to the position of the first posture (FIG. 7A).

The configuration of the lock mechanism 22 described above is merely an example and is not limited to the configurations described above.

Therefore, until the upper main body 112 and the in-body paper discharge tray 151 enter the open state, the position of the lock mechanism 22 can be changed between the first posture (FIG. 7A) and the second posture (FIG. 7B) by the carriage 167a pressing the lock mechanism 22 by means of the drive power of the movement controller 4. Accordingly, the carriage 167a can be held at the home position HP when, for example, the upper main body 112 and the in-body paper discharge tray 151 are in the closed state.

When the upper main body 112 and the in-body paper discharge tray 151 are in the open state, the drive power of the movement controller 4 can move the carriages 167a, 167b to the retreat position via the lock mechanism 22.

Even when the vibrations that are imposed when closing the upper main body 112 and the in-body paper discharge tray 151 are applied to the carriages 167a, 167b after the carriages 167a, 167b are moved to the retreat position, the movement of the carriages 167a, 167b in the sub-scanning direction from the retreat position to the contact glass 161 is regulated by the lock mechanism 22. This can reduce the risk of damage to the carriages 167a, 167b and the contact glass 161 that is caused when the carriages 167a, 167b hit the contact glass 161.

Each of the embodiments above has described the combined machine as an example of the image forming apparatus according the present invention, the combined machine having a scanner function, printer function, copy function and the like, but the image forming apparatus according to the present invention can be applied to not only the combined machine but also other types of image forming apparatuses (such as copy machines).

Note that the present invention is not limited to the configurations described in the above embodiments, and various modifications can be made. The configurations and processes shown in FIGS. 1 to 7B merely illustrate the embodiments according to the present invention and do not intend to limit the present invention to these embodiments.

This application is based on Japanese Patent application No. 2010-093957 filed in Japan Patent Office on Apr. 15, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
    an image reader, which has an original document table for placing an original image thereon; and an image reading part that has a light source part for irradiating the original image with illumination light, a light-receiving part that receives reflected light reflected off the original image when the illumination light is emitted from the light source part, and accordingly generates image data of the original image, a reflection part that reflects the reflected light from the original image toward the light-receiving part, and a carriage that supports the light source part and the reflection part;

a replacement cover that covers a replacement member provided in the image forming apparatus and is opened/closed integrally with the image reader;

a main body part that accommodates an operation part for performing operations based on the image data generated by the image reader;

an opening/closing axis that connects the image reader and the main body part to each other and turnably supports the image reader and the replacement cover in an approaching/separating direction with respect to the main body part;

an open/close detector that detects an open state in which the image reader and the replacement cover are separated from the main body part, and a closed state in which the image reader and the replacement cover are in abutment with the main body part; and a movement controller that moves the carriage in a sub-scanning direction in relation to a main scanning direction of the image reader, wherein when the open/close detector detects that the image reader and the replacement cover are in the open state, the movement controller moves the carriage to a retreat position that is located away from a position where the carriage faces the original document table, and is provided within a certain range previously determined with respect to the opening/closing axis.

2. The image forming apparatus according to claim 1, further comprising:

a movement detector that detects whether the carriage is moved to the retreat position; and an alert issuing part that issues an alert when the movement detector detects that the carriage is not moved to the retreat position in a case in which the open/close detector detects that the image reader and the replacement cover are about to be in the closed state.

3. The image forming apparatus according to claim 1, further comprising:

a lock mechanism that regulates the movement of the carriage in the sub-scanning direction that is caused by the movement controller, wherein the lock mechanism has:

a lock member provided at a position that is above or below a path of the movement of the carriage, and is closer to the original document table than the retreat position in the sub-scanning direction;

a biasing member that biases the lock member in a direction toward the carriage that moves along the path of the movement of the carriage, and supports the lock member such that the lock member moves freely in this direction between a first posture that allows the carriage to be moved in the sub-scanning direction toward the retreat position or the original document table by a drive power of the movement controller, and a second posture that regulates the movement of the carriage in the sub-scanning direction at a position protruding more toward the path of the movement of the carriage than a position of the first posture;

a first inclined part that is formed in the lock member as a part of the lock member so as to face the carriage, and moves the lock member in a direction against a biasing force of the biasing member, from the second posture to the first posture, by means of a pressure generated by a front part of the carriage in the direction of movement of the carriage that moves in the sub-scanning direction toward the retreat position by the drive power of the movement controller; and a second inclined part that is formed in the lock member as a part of the lock member so as to face the carriage, and moves the lock member in a direction against the biasing force of the biasing member, from the second posture to the first posture, by means of a pressure generated by a front part of the carriage in the direction of movement of the carriage that moves in the sub-scanning direction from the retreat position toward the original document table by the drive power of the movement controller.

* * * * *